US010291841B2

(12) United States Patent
Kim et al.

(10) Patent No.: US 10,291,841 B2
(45) Date of Patent: *May 14, 2019

(54) METHOD AND APPARATUS FOR SUPPORTING IMAGE PROCESSING, AND COMPUTER-READABLE RECORDING MEDIUM FOR EXECUTING THE METHOD

(71) Applicant: Intel Corporation, Santa Clara, CA (US)

(72) Inventors: Daesung Kim, Guri-si (KR); Jaihyun Ahn, Sung Nam (KR)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/799,738

(22) Filed: Jul. 15, 2015

(65) Prior Publication Data

US 2016/0006949 A1 Jan. 7, 2016

Related U.S. Application Data

(63) Continuation of application No. 14/129,321, filed as application No. PCT/KR2013/001486 on Feb. 25, 2013, now Pat. No. 9,124,814.

(30) Foreign Application Priority Data

Feb. 23, 2012 (KR) .................. 10-2012-0018738

(51) Int. Cl.
*H04N 5/232* (2006.01)
*G06F 3/0482* (2013.01)
(Continued)

(52) U.S. Cl.
CPC ....... *H04N 5/23216* (2013.01); *G06F 3/0482* (2013.01); *G06F 3/04817* (2013.01);
(Continued)

(58) Field of Classification Search
CPC .......... H04N 5/23216; H04N 5/23293; H04N 5/272; H04N 5/262
See application file for complete search history.

(56) References Cited

U.S. PATENT DOCUMENTS 8,041,076 B1 * 10/2011 Bourdev ............ H04N 5/23219
382/103
8,264,583 B2 9/2012 Yamaji et al.
(Continued)

FOREIGN PATENT DOCUMENTS

EP 2124186 11/2009
JP 2008236489 10/2008
(Continued)

OTHER PUBLICATIONS

European Search Report for EP Counterpart Application No. 13752541.6, 7 pgs., (Sep. 10, 2015).
(Continued)

*Primary Examiner* — James H Hannett
(74) *Attorney, Agent, or Firm* — Womble Bond Dickinson (US) LLP

(57) ABSTRACT

A support for image processing is provided, comprising: (a) detecting respective face regions from images consecutively photographed for a first person at predetermined time intervals by an image pickup unit to display images of the face regions detected in relation to the first person in a first region of a screen, and providing a user interface for indicating that a specific face image is selected from the face images of the first person displayed in the first region; (b) additionally displaying the specific face image through a second region adjacent to the first region; and (c) displaying a synthesized image using the specific face image as a representative face of the first person, when the specific face image displayed through the second region is selected.

27 Claims, 14 Drawing Sheets

(51) Int. Cl.
*H04N 5/272* (2006.01)
*G06F 3/0481* (2013.01)
*G06K 9/00* (2006.01)
*H04N 1/00* (2006.01)
*H04N 5/262* (2006.01)

(52) U.S. Cl.
CPC ..... *G06K 9/00221* (2013.01); *G06K 9/00302* (2013.01); *H04N 1/00411* (2013.01); *H04N 5/23219* (2013.01); *H04N 5/23293* (2013.01); *H04N 5/262* (2013.01); *H04N 5/272* (2013.01)

(56) References Cited

U.S. PATENT DOCUMENTS

| | | | |
|---|---|---|---|
| 8,432,357 | B2 | 4/2013 | Ogura et al. |
| 8,482,651 | B2 | 7/2013 | Asukai et al. |
| 9,124,814 | B2 * | 9/2015 | Kim ............... G06F 3/0482 |
| 2007/0147826 | A1 | 6/2007 | Matsuzaki et al. |
| 2008/0187185 | A1 | 8/2008 | Misawa et al. |
| 2008/0240563 | A1 | 10/2008 | Takano et al. |
| 2008/0317285 | A1 | 12/2008 | Abe |
| 2009/0304238 | A1 * | 12/2009 | Ebata ............... G06K 9/00288 382/118 |
| 2010/0066840 | A1 | 3/2010 | Asukai et al. |
| 2010/0091105 | A1 | 4/2010 | Watanabe |
| 2010/0157804 | A1 | 6/2010 | Shimamura et al. |
| 2011/0013038 | A1 | 1/2011 | Kim et al. |
| 2011/0242336 | A1 | 10/2011 | Yamaji |
| 2011/0268369 | A1 | 11/2011 | Richards et al. |

FOREIGN PATENT DOCUMENTS

| | | |
|---|---|---|
| KR | 10-2007-0006337 | 1/2007 |
| KR | 10-2008-0004384 | 1/2008 |

OTHER PUBLICATIONS

PCT Search Report and Written Opinion, PCT/KR2013/001486, dated Apr. 5, 2013, 9 pages.
EP Supplemental Search Report, EP16163328, dated May 20, 2016, 8 pages.
EP Supplemental Search Report, EP16163386.2. dated Jun. 8, 2016, 7 pages.
Office Action for U.S. Appl. No. 14/878,477 dated Sep. 1, 2016.
Final Office Action for U.S. Appl. No. 14/878,477 dated Dec. 20, 2016.
PCT International Preliminary Report on Patentability for PCT/KR2013/001486, dated Aug. 26, 2014, dated Sep. 4, 2014, 6 pages.

* cited by examiner

METHOD AND APPARATUS FOR SUPPORTING IMAGE PROCESSING, AND COMPUTER-READABLE RECORDING MEDIUM FOR EXECUTING THE METHOD

The present patent application is a continuation application claiming priority from U.S. application Ser. No. 14/129,321, filed Dec. 26, 2013 pending, which claims priority from U.S. National Phase Application under 35 U.S.C. 371 of International Application No. PCT/KR2013/001486 filed Feb. 25, 2013, which claims priority from Korean Application No. 10-2012-0018738, filed Feb. 23, 2012, the contents of which are incorporated herein in their entirety by reference.

TECHNICAL FIELD

The present disclosure relates to a method and apparatus for supporting image processing and a computer-readable recording medium for executing the method, according to which pictures are taken a number of times at predetermined time intervals, face images are extracted from the photographed pictures, an array of the images are displayed in a user-friendly manner such that a user may easily select a face image desired by the user, and other user interfaces are appropriately provided.

BACKGROUND ART

Portable terminals are made smaller and lighter over time, gradually improving their portability and convenience and increasing the customer demands. Subsequently, functionalities added to portable terminals have diversified.

Particularly, as portable terminals equipped with photographing devices, including digital devices dedicated to capturing images, such as digital cameras, digital camcorders, and the like, have been in wide use in recent years, the number of users creating digital data such as digital pictures or moving images are in an increasing trend. Among others, a camera embedded in a portable terminal is remarkably advanced in performance and widely used in substitution for a digital camera.

Particularly, since pictures can be easily edited and synthesized on the portable terminal as compared to a digital camera, the portable terminal is widely used for the purpose of editing or synthesizing photographed pictures, in addition to simply taking pictures.

For example, a method of editing an image using a portable terminal is disclosed in Korean Patent Application Publication No. 10-2007-0006337 published on Jan. 11, 2007, entitled "Method of editing images in a portable terminal." It is confirmed that the method pertains to a technique of selecting three regions using positions of the eyes and the mouth on an image photographed using a portable terminal and selecting a type of facial expression for each of the regions, thereby acquiring a picture with a different facial expression.

However, such a method of editing or synthesizing a picture using a portable terminal according to the prior art has a problem in that the facial expression is artificially created by directly modifying a photographed picture and thus is unnatural, and the user needs to edit a picture using an inconvenient user interface and thus needs to put in a lot of effort.

DISCLOSURE OF INVENTION

In some embodiments, an object of the present disclosure lies in solving all the problems described above.

In some embodiments, another object of the present disclosure is to provide a user-friendly interface capable of extracting face images from consecutively photographed pictures and to select and edit a face image desired by a user with ease.

In some embodiments, a further object of the present disclosure is to provide a user-friendly interface so that a user may intuitively and easily find a desired image in editing the images as described above.

In some embodiments, a still further object of the present disclosure lies in automatically creating the most desirable synthesized image according to pre-stored conditions.

Various embodiments of the present disclosure for achieving the aforementioned objects is as described below.

According to some aspects of the present disclosure, there is provided a method for supporting image processing, comprising: (a) detecting respective face regions from images consecutively photographed for a first person at predetermined time intervals by an image pickup unit to display images of the face regions detected in relation to the first person in a first region of a screen, and providing a user interface for indicating that a specific face image is selected from the face images of the first person displayed in the first region; (b) additionally displaying the specific face image through a second region adjacent to the first region; and (c) displaying a synthesized image using the specific face image as a representative face of the first person, when the specific face image displayed through the second region is selected.

According to some aspects of the present disclosure, there is provided an apparatus for supporting image processing, comprising: a display unit configured to detect respective face regions from images consecutively photographed for a first person at predetermined time intervals by an image pickup unit, display images of the face regions detected in relation to the first person in a first region of a screen, provide a user interface indicating that a specific face image is selected from the face images of the first person displayed in the first region, and additionally display the specific face image through a second region adjacent to the first region; and an image synthesizing unit configured to display a synthesized image using the specific face image as a representative face of the first person, when the specific face image displayed through the second region is selected.

In addition, there is further provided a computer-readable recording medium for recording a computer program for executing other methods and apparatuses and the aforementioned methods for implementing various aspects of the present disclosure.

In some embodiments, the present disclosure may provide a user-friendly interface in order to extract face images from pictures consecutively photographed at predetermined time intervals and further easily edit a face image desired by a user.

In addition, it is possible to automatically create an image optimally synthesized from respective face images of various people according to a predetermined condition.

BEST MODE FOR CARRYING OUT THE INVENTION

Figure 1:
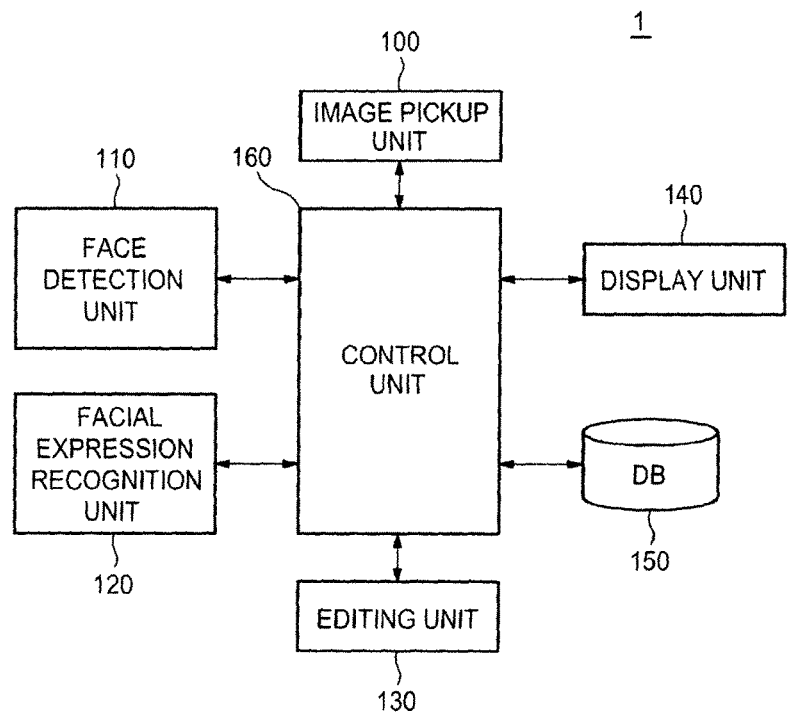
FIG. 1 illustrates an image processing support apparatus, according to some embodiments.

In the following detailed description of the present disclosure, references are made to the accompanying drawings that show, by way of illustration, specific embodiments in which various embodiments of the present disclosure may be implemented. These embodiments are described in sufficient detail to enable those skilled in the art to implement the present disclosure. It should be understood that various embodiments of the present disclosure, although different, are not necessarily mutually exclusive. For example, specific feature, structure, and characteristic described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range equivalent to what the claims claim. In the drawings, like reference numbers refer to the same or similar function through many ways.

Hereinafter, various embodiments of the present disclosure will be described in detail with reference to the accompanying drawings in order to easily implement the present disclosure by those skilled in the art.

Configuration of Entire Apparatus

FIG. 1 illustrates an image processing support apparatus, according to some embodiments.

Referring to FIG. 1, an image processing support apparatus 1 may include an image pickup unit 100, a face detection unit 110, a facial expression recognition unit 120, an editing unit 130, a display unit 140, a database 150 and a control unit 160.

Here, the image processing support apparatus 1 of FIG. 1 is a digital device, and any portable digital device provided with a memory means and equipped with a microprocessor and thus having operation capability, such as a personal computer (e.g., a tablet computer, a notebook computer or the like), a PDA, a web pad, a cellular phone or the like, can be adopted as the image processing support apparatus 1 in any degree.

The image pickup unit 100 may be formed of any image pickup device, for example, it may be a digital camera that creates digital image signals using a CCD. The image pickup unit 100 may be configured to have an image pickup device implementing an automatic focusing (AF) function and a continuous photographing function.

The automatic focusing function is a function of an optical system (a camera) for automatically focusing on a specific object (a subject), which can be generally divided into an active system and a passive system. The active system focuses a camera by radiating ultrasonic waves or infrared rays in order to measure a distance, and the passive system focuses a camera using rays naturally reflected from an object. The automatic focusing function may adopt any known method.

The continuous photographing function may also adopt a variety of methods. For example, a photographing function may be implemented so as to set the number of images that are photographed consecutively at predetermined time intervals by the image pickup unit 100.

The face detection unit 110 may be configured to detect a face region in a photographed image using a face detection (FD) technique when a face is contained in the image photographed by the image pickup unit 100. Any one of a variety of techniques can be used as the FD technique. For example, detection may be performed using feature patterns learned and selected by an AdaBoost learning algorithm. The applicant of the present disclosure has already filed Korean Patent Application No. 10-2011-011460 entitled "Method and Apparatus for Detecting Face, and Computer-Readable Recording Medium for Executing the Method," which relates to a method and apparatus for detecting a face from an image, may be combined with the present disclosure, and is hereby incorporated by reference. The face detection unit 110 may detect faces from a plurality of respective images consecutively photographed, and images of the detected faces can be stored in the database 150.

The facial expression recognition unit 120 is configured to recognize an expression of a face detected by the face detection unit 110. Specifically, the facial expression recognition unit 120 may be configured to determine whether a face shown in an image is smiling, blinking eyes, or expressionless using FD (Face Detection), SD (Smile Detection) and/or BD (Blink Detection) techniques. Any one of various techniques can be used as the FD, SD and/or BD techniques. For example, a facial expression recognition operation may be performed by obtaining coordinate values of feature patterns from the face image detected by the face detection unit 110 and referring to the range of the respective coordinate values of the feature patterns. For example, the applicant of the present disclosure has already filed Korean Patent Application No. 10-2011-0105548 entitled "Method and apparatus for recognizing a face, and computer-readable recording medium for executing the method," which relates to a method and apparatus for recognizing a facial expression in an image, may be combined with the present disclosure, and is hereby incorporated by reference. The facial expression recognition unit 120 may acquire a facial expression icon corresponding to the facial expression recognized as described above from the database, and the facial expression icon may also be output when the face image is output through the display unit 140.

The editing unit 130 provides an editing function of selecting a base image that will be used as a background image among the images consecutively photographed by the image pickup unit 100 and a face image that will be synthesized with the corresponding base image. In addition, the editing unit 130 may create a synthesized image by synthesizing the base image and the face image. The editing unit 130 will be described below in more detail with reference to FIG. 2.

The display unit 140 may be configured to output the image photographed by the image pickup unit 100 and the image edited and synthesized by the editing unit 130. Any one of various display means such as, but not limited to, an LCD, a PDP, an LED and the like, may be applied as the display unit 140. Since the image processing support apparatus 1 described below with reference to FIGS. 3 to 9 can be implemented to input a command using a touch screen, in this case, the display unit 140 can be provided with a touch screen function.

The database 150 may store the images photographed by the image pickup unit 100 and the face images detected by the face detection unit 110. In addition, the database 150 may store the synthesized images in which the face images and the base images are synthesized.

The control unit 160 may be configured to control data flow between the image pickup unit 100, the face detection unit 110, the facial expression recognition unit 120, the editing unit 130, the display unit 140 and the database 150. That is, the control unit 160 controls the flow of data to/from the outside or between the respective constitutional components of the image processing support apparatus 1, so that the image pickup unit 100, the face detection unit 110, the facial expression recognition unit 120, the editing unit 130, the display unit 140 and the database 150 may perform their respective unique functions.

Figure 2:
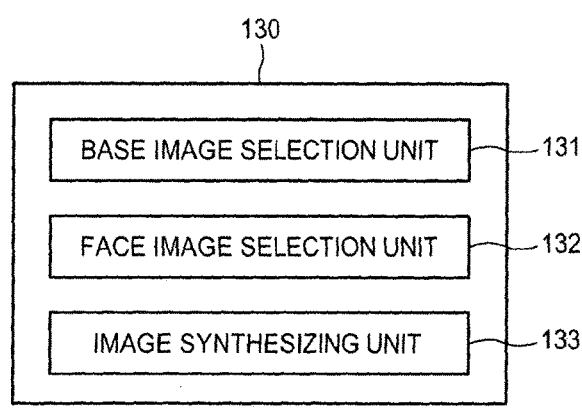
FIG. 2 illustrates an editing unit, according to some embodiments.

FIG. 2 illustrates an editing unit, according to some embodiments.

Referring to FIG. 2, the editing unit 130 may include a base image selection unit 131, a face image selection unit 132 and an image synthesizing unit 133.

The base image selection unit 131 may be configured to provide an editing environment for selecting a base image that will be used as a background image from the images consecutively photographed by the image pickup unit 100. In other words, a user may select a user-preferred base image from the photographed images output through the display unit 140, and if a base image is selected, the editing unit 130 temporarily stores the selected base image and uses the base image in creating a synthesized image, which will be described later.

The face image selection unit 132 provides an editing environment for outputting the face images detected by the face detection unit 110 from the photographed images so that a user may select a face image. The user may select a user-preferred face image among the output face images, and if a face image is selected, the editing unit 130 temporarily stores the selected face image and uses the face image for image synthesis described below.

In some embodiments, the selection of the base image and the face image may sequentially proceed, and when the user selects a base image and then selects a face region (see reference numeral 340 of FIG. 5c that will be described later) in the base image, the process may proceed to the step of selecting a face image. Of course, the selection steps may proceed not sequentially but independently. This will be described below in more detail with reference to FIGS. 7a to 7c.

The image synthesizing unit 133 performs a function of synthesizing the face image selected in the face image selection unit 132 with the base image selected in the base image selection unit 131. As described above, among the images consecutively photographed at predetermined time intervals as a candidate group, the images containing a background and facial expression are selected by a user based on his/her preference and then the selected images are synthesized, so that an image that is satisfactory to the user in terms of the background and the person illustrated in the image can be provided. Although a procedure for selecting the user-preferred background as a base image is described herein by way of an example, the present disclosure is not necessarily limited thereto, but it is apparent that a user-preferred shot may also be allowed to be selected having a person shown in the image after an arbitrary base image is selected by default under the assumption that there is little difference in the background of the images. Hereinafter, a user interface (UI) for specific implementation of the present disclosure will be described with reference to the following figures.

Figure 3A:
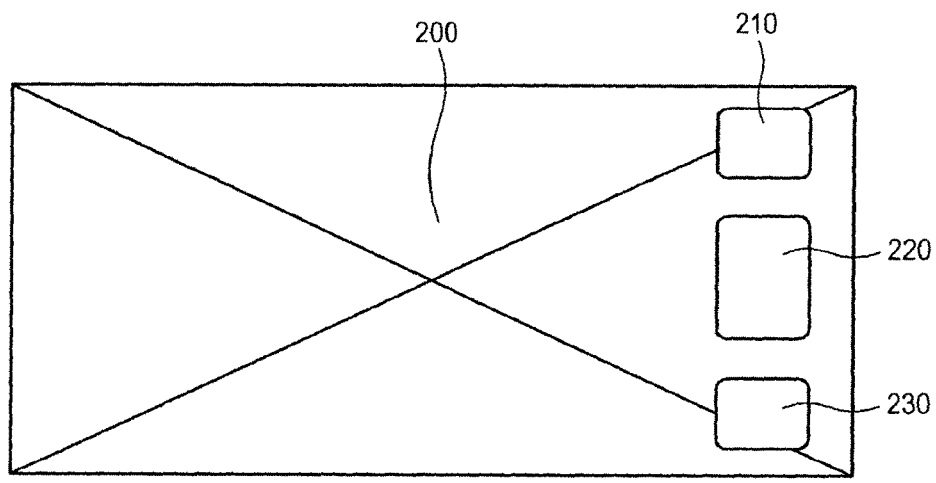
FIGS. 3a and 3b illustrate initial operation screens of an image processing support apparatus, according to some embodiments.
Figure 3B:
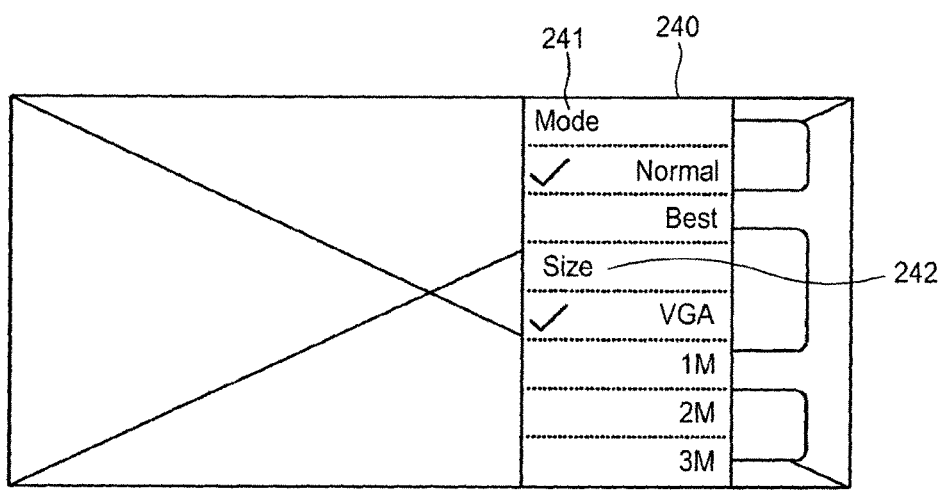

FIGS. 3a and 3b illustrate initial operation screens of an image processing support apparatus according to an embodiment of the present disclosure.

Among the figures, FIG. 3a illustrates an embodiment of a screen 200 that appears when a user executes an application of the image processing support apparatus of the present disclosure.

Referring to FIG. 3a, when the user executes an application of the image processing support apparatus, the screen 200 is provided through the display unit 140 of the image processing support apparatus, and an option button 210, a shooting button 220 and a gallery button 230 may be provided on the right side of the screen 200 in order.

An image of a face on which an image pickup device focuses may be displayed on the screen 200 when the face is photographed using the image pickup unit 100 (photographing mode), or a photographed image may be displayed on the screen 200 after the photographing is finished (image output mode). The photographing mode may be implemented not to generate any change although the user may make a selection on the screen 200.

The option button 210 is a button for calling up a shooting option menu window 240. The option menu window 240 will be described below in more detail with reference to FIG. 3b. The option menu window 240 may be closed when the user selects the option button 210 once more in a state where the option menu window 240 is called up by the selection of the option menu 210.

The shooting button 220 is a button selected when the user focuses the image processing support apparatus and takes a picture. When the user selects the shooting button 220, the image processing support apparatus is automatically focused on a subject, and a plurality of pictures can be taken at predetermined time intervals. For example, when the shooting button 220 is selected, pictures may be taken five consecutive times. The number of shootings can be diversely modified depending on the selection of the user.

The gallery button 230 is a button for switching the screen 200 to a gallery provided in the image processing support apparatus. The gallery may output a series of images photographed most recently through the image processing support apparatus as a set of images in the form of a thumbnail.

FIG. 3b illustrates a screen with the option menu window 240 that is called by a user selecting the option button 210 on the screen 200.

Referring to FIG. 3b, a Mode selection button 241 and a Size selection button 242 may be provided as the option menu. A Normal mode and a Best mode may be selected as the Mode using the Mode selection button 241. The Normal mode is a mode in which only consecutively photographed images are output as a candidate group of selection when the images are synthesized. The Best mode is a mode in which an image having a predetermined facial expression is automatically synthesized by applying the FD, SD and/or BD techniques based on the images consecutively photographed by the image processing support apparatus being output, together with the consecutively photographed images, as a candidate group. The Best mode will be described below in more detail with reference to FIG. 5c.

The Size selection button 242 is a menu for setting a size of a picture to be photographed. In one embodiment, it may be implemented to output default values of VGA (Video Graphics Array), 1M, 2M, 3M and 5M as a selection menu.

Figure 4A:
FIGS. 4a and 4b illustrate pictures showing actually implemented initial operation screens of an image processing support apparatus, according to some embodiments.
Figure 4B:
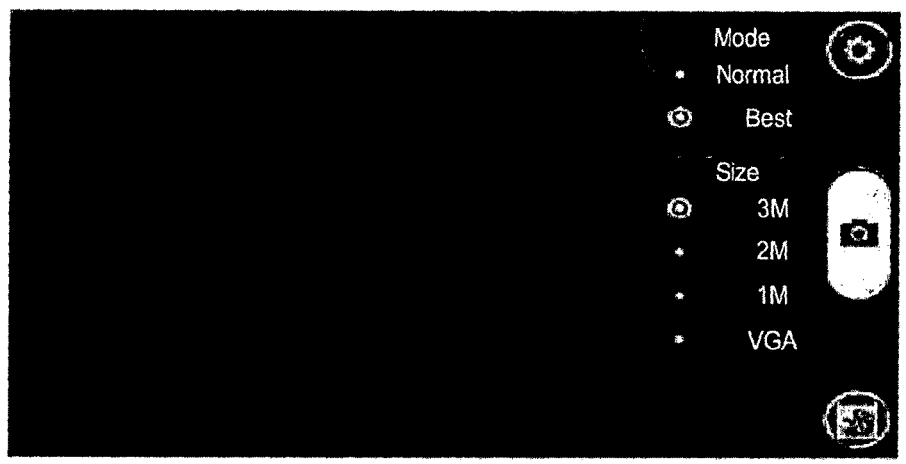

FIGS. 4a and 4b are pictures showing actually implemented initial operation screens of an image processing support apparatus according to an embodiment of the present disclosure described above.

Figure 5A:
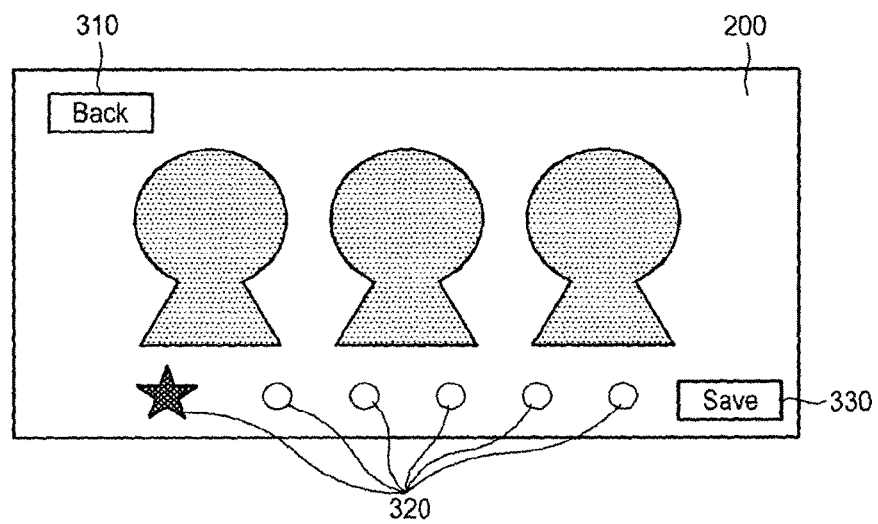
FIGS. 5a to 5c illustrate an input image selection screen of an image processing support apparatus, according to some embodiments.
Figure 5B:
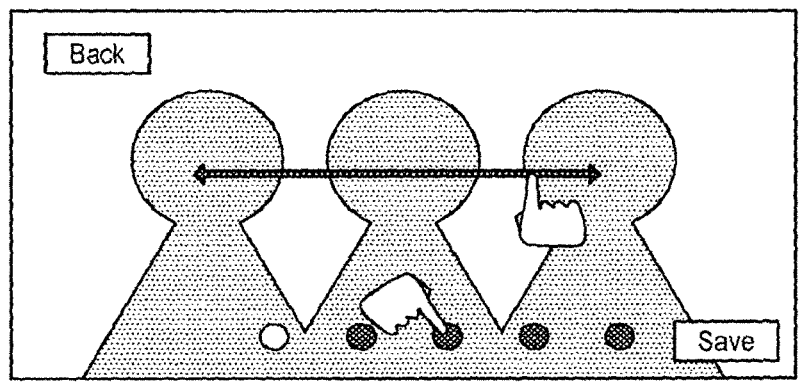
Figure 5C:
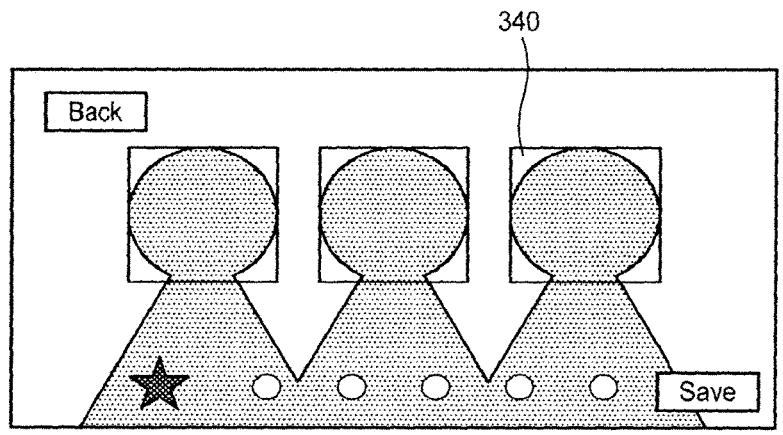

FIGS. 5a to 5c illustrate an input image selection screen of an image processing support apparatus according some embodiments.

Referring to FIG. 5a, when a person is consecutively photographed by the image pickup unit 100, a photographed image may be displayed on the screen 200 through the display unit 140. At this point, a back button 310 may be displayed on the left upper side of the output image, and base image indicators 320 may be displayed at the lower portion of the screen. In addition, a save button 330 may be displayed on the right side of the base image indicators 320.

The back button 310 is a button for switching to the shooting mode. Accordingly, when a user resumes photographing after the user has stopped taking pictures, the image output mode can be switched to the shooting mode by selecting the back button 310. In addition to the back button 310, the user may also switch the image output mode to the shooting mode by selecting a back button 310 that is implemented in hardware on the image processing support apparatus.

The base image indicators 320 show a sequential position of the image currently displayed on the screen 200 among the consecutively photographed images. In one embodiment, the base image indicators 320 may be displayed as many small points as the number of photographed images at the lower portion of the screen 200. The consecutively photographed images may be matched to the base image indicators 320 in one-to-one correspondence, and when a matched image is output on the screen 200, the color of corresponding one of the base image indicators 320 may be changed to be distinguished from the other base image indicators 320. The base image indicators 320 can be implemented to be displayed on the screen 200 at all times or implemented to be displayed only when a user scrolls the screen 200. Alternatively, the base image indicators 320 can be implemented to be output only when the user selects a region other than the face region of an image output on the screen 200.

The save button 330 performs a function of saving the image output on the screen 200 into the gallery.

FIG. 5b illustrates a method of searching the consecutively photographed images. Referring to FIG. 5b, since the base image indicators 320 and the photographed images are matched in a one-to-one correspondence, a user may output a desired photographed image on the screen 200 by selecting one of the base image indicators 320 matching to the desired image. Alternatively, the user may search for a user-preferred photographed image by sequentially switching the output image by scrolling the screen 200 left and right. At this point, the user may grasp a relative position of the photographed image currently displayed on the screen 200 using the base image indicators 320.

FIG. 5c shows an example of a base image selection screen displayed when the Best mode is selected. Referring to FIG. 5c, when the image processing support apparatus operates in the Best mode, a best image synthesized using the consecutively photographed images may be additionally provided in a base image candidate group, in addition the consecutively photographed images. In other words, when the image processing support apparatus operates in the Best mode, 'the number of photographed images +1' may be the number of images in the base image candidate group in the base image selection step. The best image may be an image optimized by combining the photographed images using the FD, SD and/or BD techniques. The conditions for selecting the best image may be set before taking a picture. For example, when an image of a smiling expression of a person is preset as a condition of the best image, the best image can be created by synthesizing a smiling face image with a base image. Such a best image is particularly very useful when several people take pictures together. When three people take pictures as shown in FIG. 5c, a best image perfectly meeting the condition set by the user can be created by detecting an image of a smiling face for each person from the photographed images and automatically synthesizing the detected face image with the base image.

Base image indicators 320 of different shapes may be used in order to distinguish the best image from the other photographed images. For example, in FIG. 5c, a star-shaped base image indicator 320 may be an indicator matching to the best image. Accordingly, when a user desires to select the best image from the base image selection screen, the user may select the star-shaped base image indicator 320 or search for the best image by scrolling the screen 200. However, for the convenience of search, the best image may be output as a base image on the base image selection screen.

A rectangle drawn around the face of a person may be indicated, which means a detected face region 340. More specifically, when a face of a person is detected by applying the FD technique to the photographed image, the face region 340 is indicated in the shape of a box at the detected area. When the user selects the face region 340, the selection of a base image is finished, and the process proceeds to the face image selection step.

Figure 6:
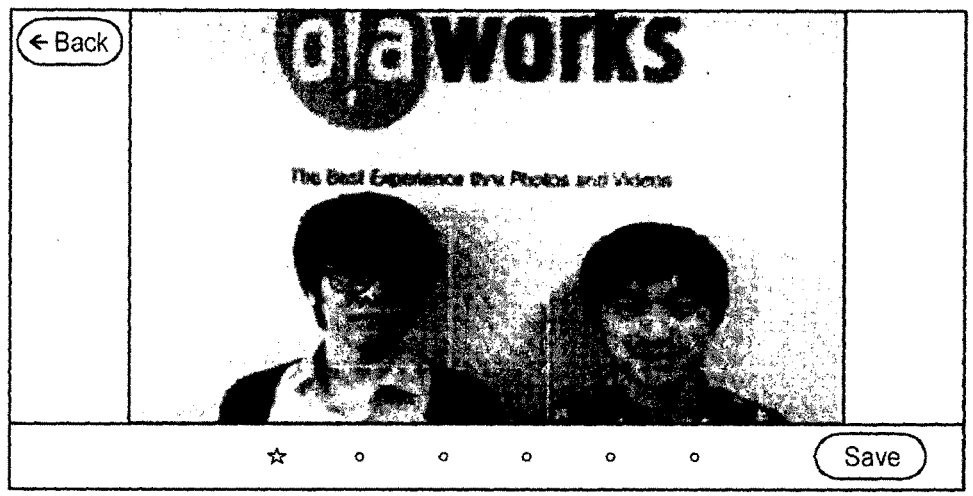
FIG. 6 is a picture showing an actually implemented input image selection screen when the best mode is selected, according to some embodiments.

FIG. 6 is a picture showing an actually implemented input image selection screen when the best mode is selected according to some embodiments.

Figure 7A:
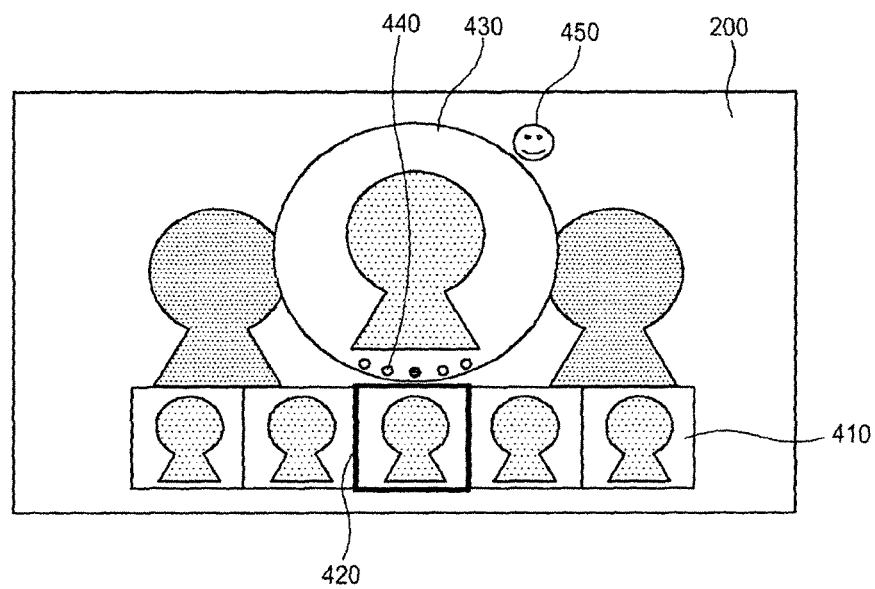
FIGS. 7a to 7c illustrate a face image selection screen of an image processing support apparatus, according to some embodiments.
Figure 7B:
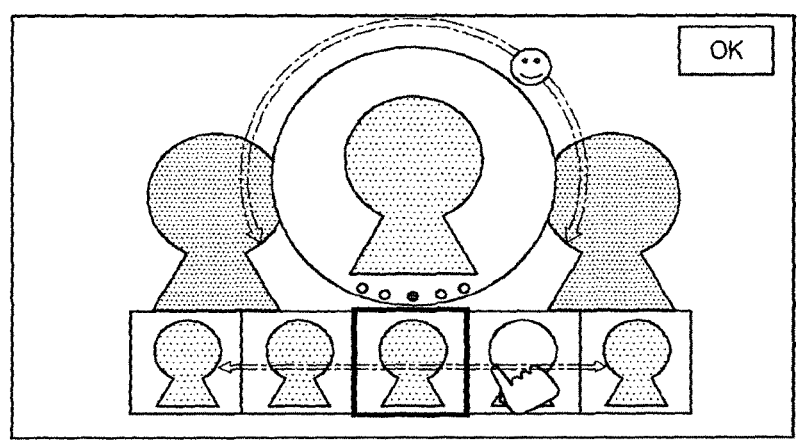
Figure 7C:
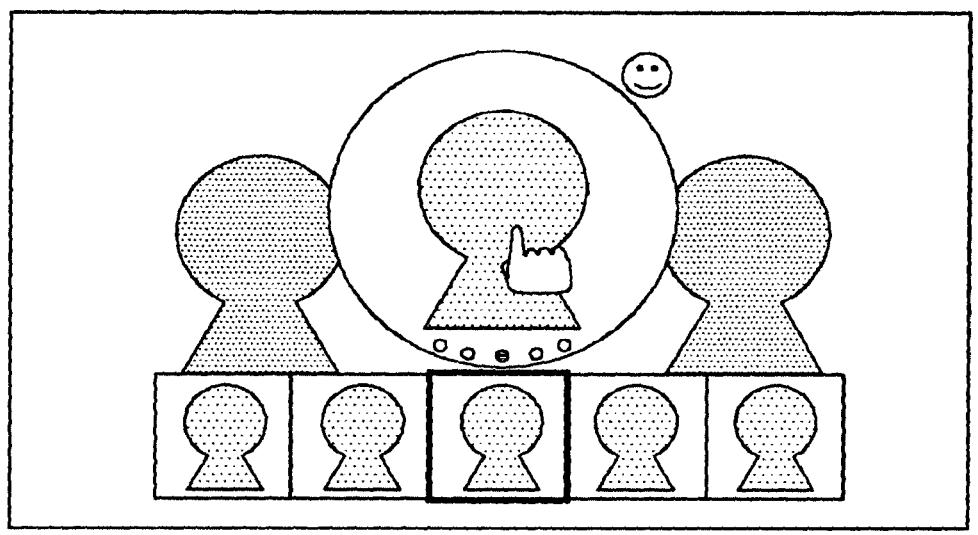

FIGS. 7a to 7c are views showing a face image selection screen of an image processing support apparatus according to some embodiments.

When a user selects a face region 340 from the photographed image output on the screen 200 in the base image selection step, the base image selection step is finished, and the process proceeds to the face image selection step. The screen configuration of the face image selection step will be described with reference to FIG. 7a. First, a plurality of face images that may be a target of selection may be simultaneously displayed at the lower portion of the screen 200 in the form of thumbnails. This is defined as a face image candidate group 410, and the area on the screen displaying the face image candidate group 410 is defined as a first region. A face image selected in a face image selection window 420 among the face image candidate group 410 can be enlarged and output in a face image enlargement window 430 displayed at the center of the screen 200. An area on the screen displaying the face image enlargement window 430 is defined as a second region. If there is a user-preferred face image in the face image candidate group 410, the user may adjust the face image to be positioned in the face image selection window 420 and select the face image by clicking the image enlargement window 430. A method of positioning a favorite face image among the face image candidate group 410 in the face image selection window 420 will be described below in more detail with reference to FIG. 7b.

Face image indicators 440 may be displayed at the lower portion inside the face image enlargement window 430. Like the base image indicators 320, the face image indicators 440 can be displayed as many small points as the number of face images. The face images may be matched to the face image indicators 440 in one-to-one correspondence, and when a matched face image is output in the image enlargement window 430, the color of corresponding one of the face image indicators 440 may be changed to be distinguished from the other face image indicators 440.

In addition, a facial expression icon 450 may be output around the face image enlargement window 430. The facial expression icon 450 may be figuration of a facial expression formed by analyzing a selected face image using the FD, SD and/or BD techniques. Further specifically, the facial expression icon 450 may be a figuration of an expressionless face, a smiling face, blinking eyes or the like. Accordingly, since the user may recognize an expression of a face image matching to the facial expression icon 450 by only seeing the facial expression icon 450, the user may search for a desired face image easily. If the favorite face image positioned in the face image selection window 420 among the face image candidate group 410 is changed, the position in which the facial expression icon 450 is displayed is also changed. That is, if the face image displayed in the face image selection window 420 is changed, the position in which the facial expression icon 450 is displayed on the circumference of the face image enlargement window 430 is changed. For example, it is possible to move the facial expression icon 450 around the face image enlargement window 430 by an angle calculated by dividing the circumference of the face image enlargement window 430 with the number of images in the base image candidate group. That is, the position at which the facial expression icon 450 is displayed may be determined in accordance with the order of a specific face image displayed through the second region among all face images of the first person on the circumference around the second region.

FIG. 7b is a view illustrating a method of selecting a face image from the face image candidate group 410. Referring to FIG. 7b, a user may scroll the face image candidate group 410 output in the form of thumbnails left and right and may select a desired face image by adjusting the desired face image to be positioned in the face image selection window 420 fixed in the middle of the face image candidate group 410 through the scroll. That is, if a specific face image of the first person is displayed through the second region, the specific face image of all the face images of the first person displayed in the first region can be displayed in highlight.

In some embodiments, when the face image candidate group 410 is scrolled, the scroll may be indefinitely repeated by rolling the face image candidate group 410. Another method of selecting a face image is to output a face image desired by the user in the face image enlargement window 430 by directly selecting one of the face image indicators 440. Since the images of the face image candidate group are simultaneously output in the form of thumbnails, the user may intuitively recognize relative positions of the respective face images, and thus, the desired face image may be selected by directly selecting the face image indicator 440.

The facial expression icon 450 may be output to rotate around the face image enlargement window 430 by a predetermined angle whenever a face image is selected through the face image selection window 420. For example, when a user consecutively takes five pictures, the face image candidate group may have five face images captured from the five pictures. When the five pictures of the face image candidate group are scrolled, the facial expression icon 450 may be output while revolving around the face image enlargement window 430 by an angle of 72 degrees. As described above, the facial expression icon 450 is displayed revolving around the face image enlargement window 430 by a predetermined angle, so that a currently selected face image can be recognized by only seeing the relative position of the facial expression icon 450. As a result, the relative position of the facial expression icon 450 operates as another kind of indicator.

FIG. 7c illustrates a method of creating a synthesized image by finally selecting a face image. Referring to FIG. 7c, if a desired face image is selected through the face image selection window 420, the face image to be synthesized is finally selected by clicking the face image enlargement window 430. If the face image is selected, a synthesized image can be created by synthesizing the face image with a previously selected base image.

When several people take a picture together, a face region 340 of each person is selected in the face image selection step and then the face image synthesis described above with reference to FIGS. 7a to 7c can be performed.

Figure 8:
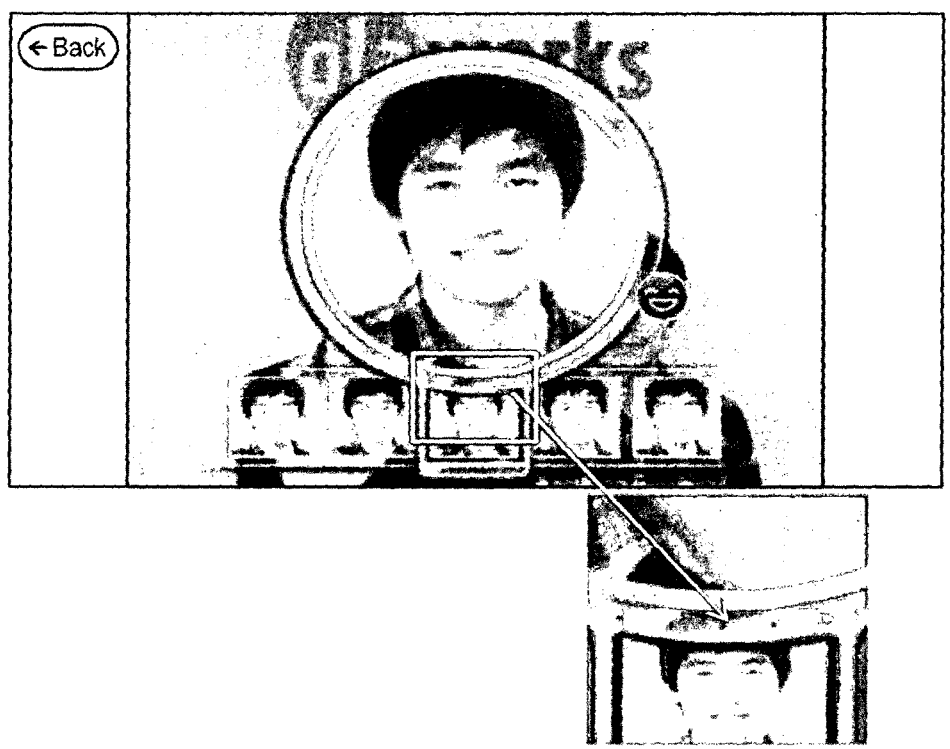
FIG. 8 is a picture showing an actually implemented face image selection screen, according to some embodiments.

FIG. 8 is a picture showing an actually implemented face image selection screen according to some embodiments.

FIGS. 9a to 9l illustrate an image synthesizing sequence according to some embodiments.

Figure 9A:
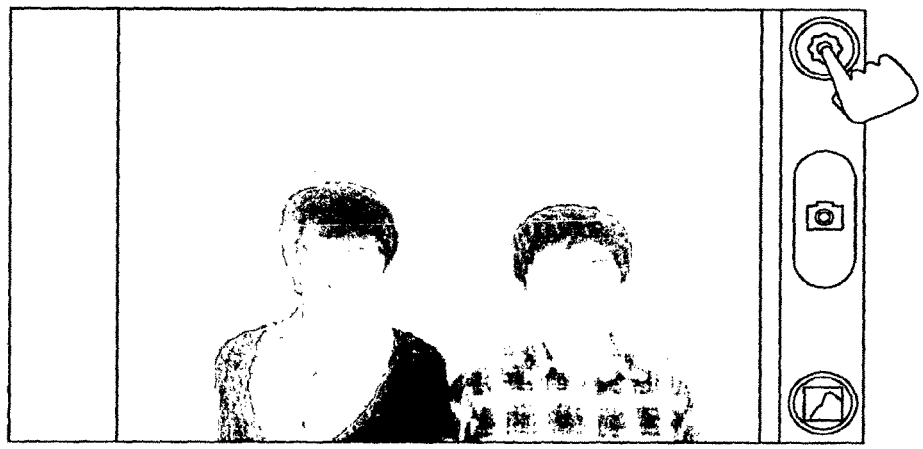
FIGS. 9a to 9l illustrate an image synthesizing sequence, according to some embodiments.
Figure 9B:
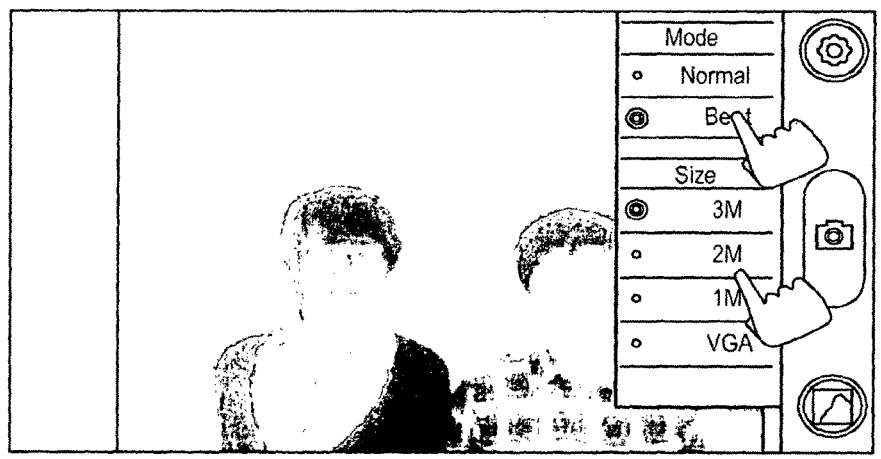
Figure 9C:
Figure 9D:
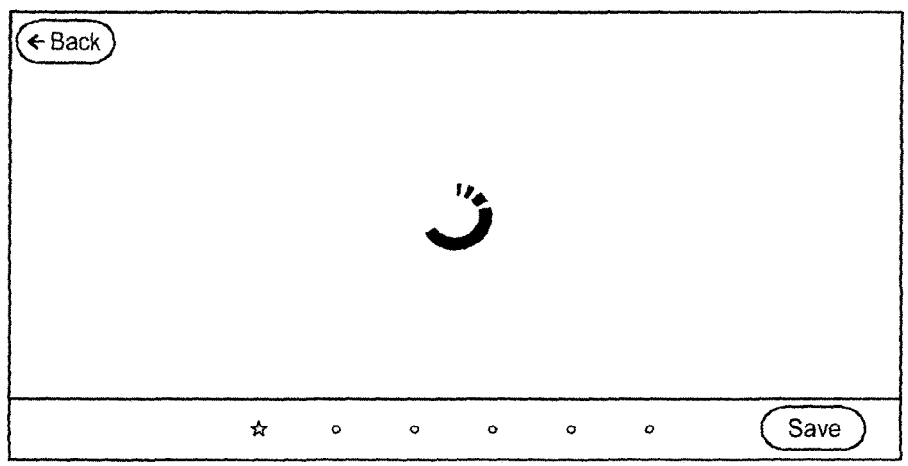
Figure 9E:
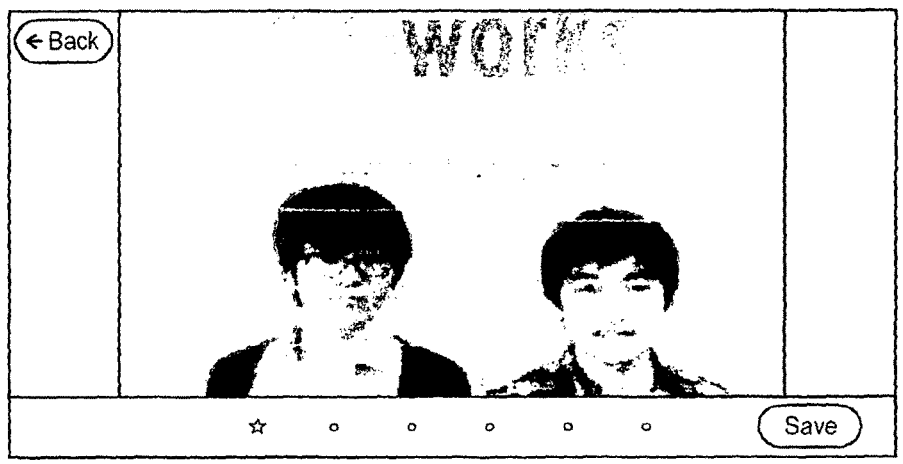
Figure 9F:
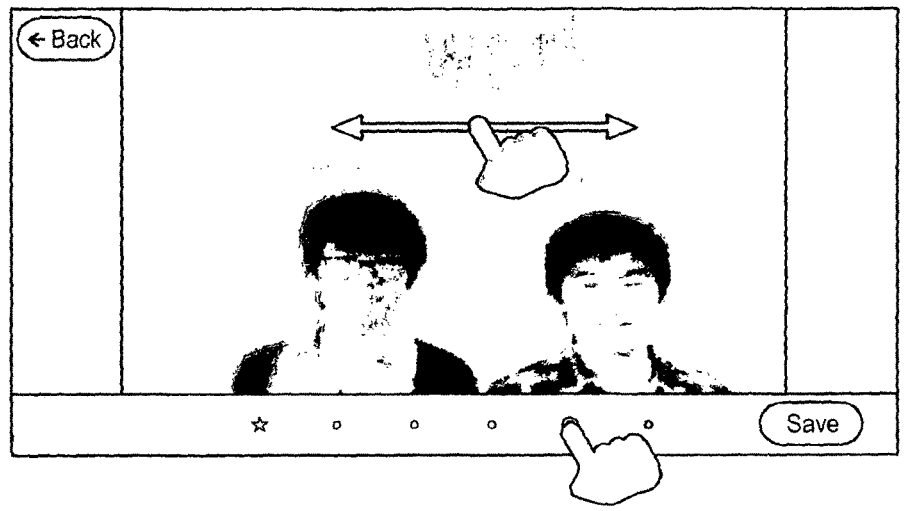
Figure 9G:
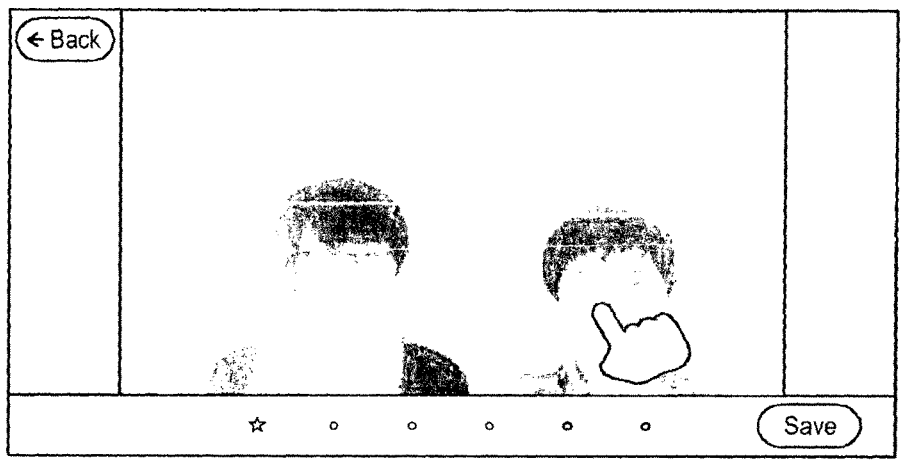
Figure 9H:
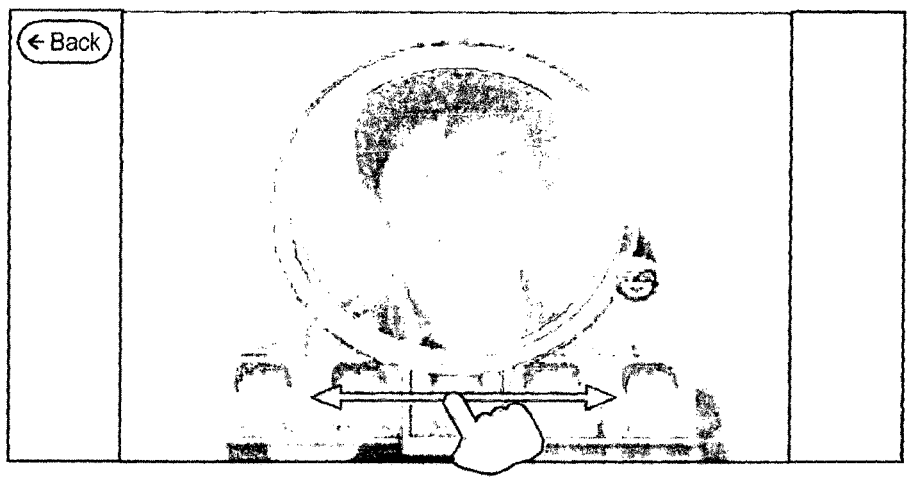
Figure 9I:
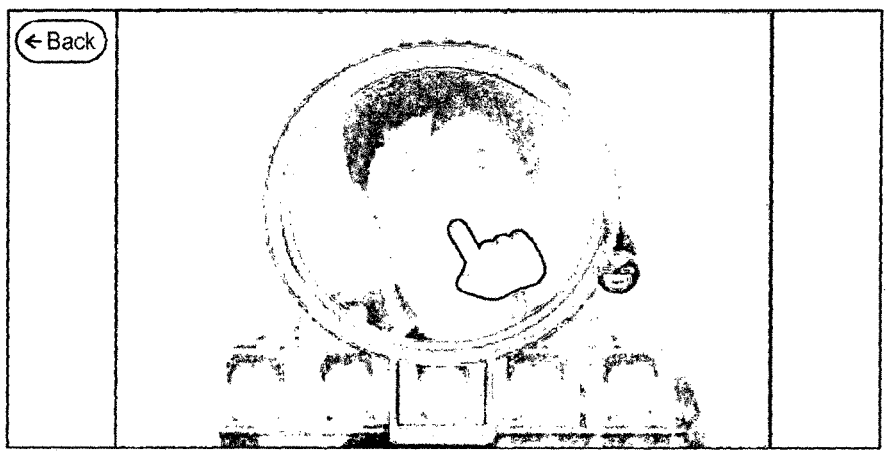
Figure 9J:
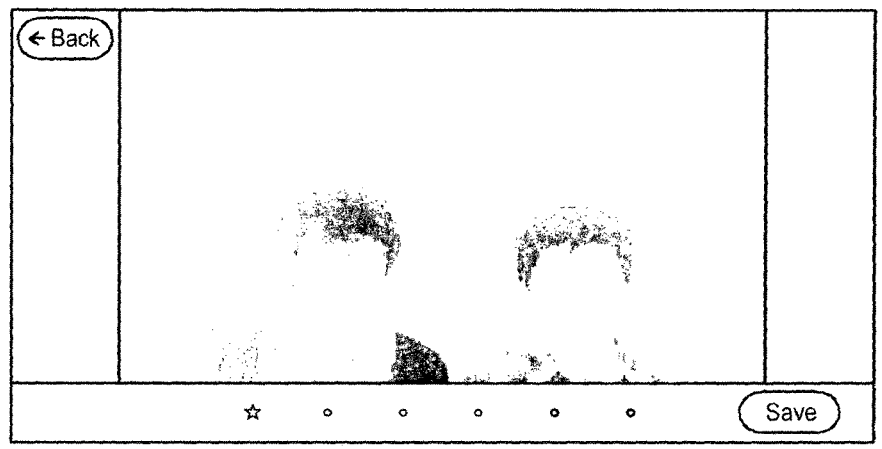
Figure 9K:
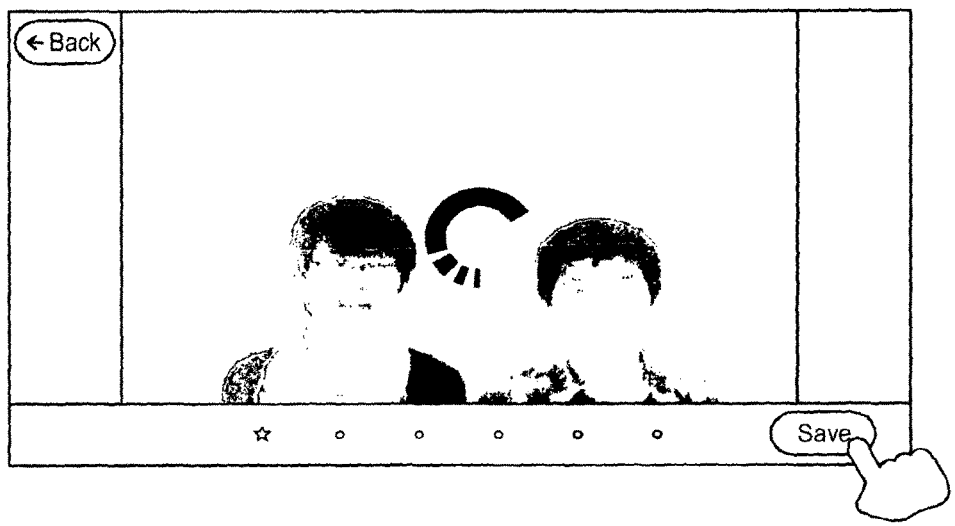
Figure 9L:
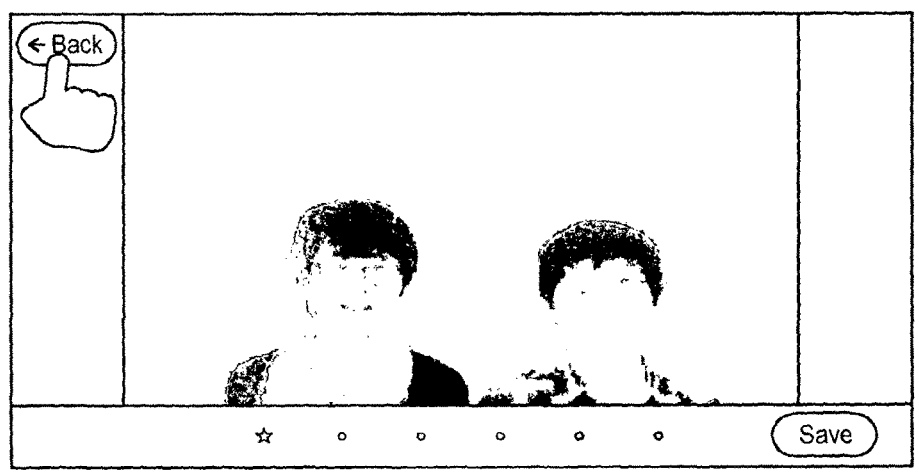

Referring to FIG. 9a, a user may operate the image processing support apparatus of the present disclosure and set a mode and size by selecting the option button 210. Referring to FIG. 9b, when the option menu window 240 is output, either the Normal mode or the Best mode may be selected from the option menu window 240, and any one of sizes including VGA, 1M, 2M and 3M may be selected. In the example shown in FIG. 9b, the Best mode and 3M are selected. Referring to FIG. 9c, the user may consecutively take pictures as many as a predetermined number of times by selecting the shooting button 220. If it is assumed that the predetermined number is five, referring to FIG. 9d, five consecutive shots will be taken at predetermined time intervals. Referring to FIG. 9e, total six images including the five consecutively photographed images and the best image created by operating in the Best mode can be output as a base image candidate group. Referring to FIG. 9f, any one of the images in the base image candidate group may be selected as a base image by scrolling the screen 200 or using the base image indicators 320. Referring to FIG. 9g, when the base image is selected, the process proceeds to the face image selection step by selecting a face region 340 in the selected base image. Since two persons are photographed in FIG. 9, face images can be selected sequentially for each person. Next, referring to FIG. 9h, one of the five face images in the face image candidate group 410 can be selected. To this end, the face image candidate group 410 can be scrolled or one of the face image indicators 440 may be directly selected, which is as described above. Referring to FIG. 9i, if a favorite face image is selected, the face image to be synthesized may be finally selected by selecting the face image enlargement window 430. Referring to FIG. 9j, if the face image is selected, a synthesized image, in which the face image is synthesized with the previously selected base image, can be created. Referring to FIG. 9k, the user may save the synthesized image by selecting the save button 330. Finally, referring to FIG. 9l, if the user desires to take pictures again, the user may select the back button to return to the shooting mode.

The embodiments according to the present disclosure described above can be implemented in the form of program commands that can be executed through various computer components and recorded in a computer-readable recording medium. The computer-readable recording medium may include a program command, a data file, a data structure and the like solely or in a combined manner. The program command recorded in the computer-readable recording medium may be a program command specially designed and configured for one or more embodiments of the present disclosure or a program command of the computer software field. The computer-readable recording medium includes, for example, a magnetic medium, such as a hard disk, a floppy disk and a magnetic tape, an optical recording medium, such as a CD-ROM and a DVD, a magneto-optical medium, such as a floptical disk, and a hardware device specially configured to store and execute program commands, such as a ROM, a RAM, a flash memory and the like. The program command includes, for example, a high-level language code that can be executed by a computer using an interpreter or the like, as well as a machine code generated by a compiler. The hardware devices can be configured to operate as one or more software or functional modules in order to perform the processing according to the present disclosure, and vice versa.

In the foregoing discussion, although the various embodiments of the present disclosure have been described in connection with the specific matters, such as the specific components, the various embodiments, and the drawings, they are provided only for assisting in the entire understanding of the present disclosure, and the present disclosure is not limited to the embodiments. It will be apparent that those skilled in the art can make various modifications and changes thereto from these descriptions.

Therefore, the spirit of the present disclosure should not be limited to the aforementioned embodiments, and the appended claims and what are modified equally or equivalently thereto will be considered to fall within the scopes of the present disclosure.

The invention claimed is:

1. A non-transitory machine readable medium having instructions stored thereon, which when executed by one or more machines, cause the machines to:
   detect a face region of a person in a plurality of photographed images of the person;
   display two or more face images of the person in a region of a screen, the two or more face images being taken from the plurality of captured photographed images of the person and corresponding to the face region detected in the plurality of photographed images;
   detect a selection of a face image from among the two or more face images;
   creating a synthesized image by replacing portions of the face image on a base image with portions of the selected face image, wherein the base image is selected from a first group of candidate base images and the face image is selected from a second group of candidate face images, wherein the first group and the second group are different groups; and
   display the synthesized image using the selected face image as a face of the person.

2. The machine readable medium according to claim 1, wherein the synthesized image comprises a combination of the selected face image and the base image.

3. The machine readable medium according to claim 1, having instructions stored thereon, which when executed by one or more machines, further cause the machines to display an indicator with the selected face image at the region of the screen.

4. The machine readable medium according to claim 1, wherein the detected face image for the person is displayed at a second region of the screen.

5. The machine readable medium according to claim 4, having instructions stored thereon, which when executed by one or more machines, further cause the machines to provide a shape around the detected face image for the person displayed at the second region of the screen.

6. The machine readable medium according to claim 4, having instructions stored thereon, which when executed by one or more machines, further cause the machines to:
   detect a face region of the person and a second person in the photographed images; and
   display face images of the person and the second person at the second region of the screen.

7. The machine readable medium according, to claim 6, having instructions stored thereon, which when executed by a processor, further cause the processor to:
   detect selection of the face image of the second person displayed at the region;
   display two or more face images of the second person at the region of the screen,
   wherein the two or more face images correspond to a face region detected in the plurality of photographed images.

8. The machine readable medium according to claim 6, having instructions stored thereon, which when executed by a processor, further cause the processor to:
   detect a selection of a face image of the second person from among the two or more face images; and
   display a synthesized image using the selected face image as a face of the second person.

9. The machine readable medium according to claim 1, having instructions stored thereon, which when executed by a processor, further cause the processor to:
   detect a selection of a second face image from among the two or more face images; and
   display the synthesized image using the second selected face image as the face of the person.

10. The machine readable medium according to claim 1, wherein the selection of a face image from among the two or more face images is detected via a user interface.

11. A system comprising:
    a storage medium to store an image processing application; and a processor to execute the image processing application to:
    detect a thee region of a person in a plurality of photographed images of the person;
    display two or more face images of the person in a region of a screen, the two or more face images being taken from the plurality of captured photographed images of the person and corresponding to the face region detected in the plurality of photographed images;
    detect a selection of a face image from among the two or more face images;
    creating a synthesized image by replacing portions of the face image of the person on a base image with portions of the selected face image, wherein the base image is selected from a first group of candidate base images and the face image is selected from a second group of candidate face images, wherein the first group and the second group are different groups; and
    display the synthesized image using the selected face image as a face of the person.

12. The system according to claim 11, wherein the processor is further configured to capture the plurality of photographed images using an image pickup unit.

13. The system according to claim 11, wherein the processor further to execute the image processing application to display an indicator with the selected face image at the region of the screen.

14. The system according to claim 11, wherein the detected face image for the person is displayed at a second region of the screen.

15. The system according to claim 14, wherein the processor further to execute the image processing application to provide a shape around the detected face image for the person displayed at the second region of the screen.

16. The system according to claim 14, wherein the processor further to execute the image processing application to:
    detect a face region of the person and a second person in the photographed images; and
    display face images of the person and the second person at the second region of the screen.

17. A method comprising:
    detecting a face region of a person in a plurality of photographed images of the person;
    displaying two or more face images of the person in a region of a screen, the two or more face images being taken from the plurality of captured photographed images of the person and corresponding to the face region detected in the plurality of photographed images;
    detecting a selection of a face image from among the two or more face images;
    creating a synthesized image by replacing portions of the face image of the person on a base image with portions of the selected face image, wherein the base image is selected from a first group of candidate base images and the face image is selected from a second group of candidate face images, wherein the tint group and the second group are different groups; and
    displaying the synthesized image using the selected face image as a face of the person.

18. The method according to claim 17, farther comprising displaying an indicator with the selected face image at the region of the screen.

19. The method according to claim 17, wherein the detected face image for the person is displayed at a second region of the screen.

20. The method according to claim 19, further comprising providing a shape around the detected face image for the person displayed at the second region of the screen.

21. The method according to claim 19, further comprising:
    detecting a face region of the person and a second person in the photographed images; and
    displaying face images of the person and the second person at the second region of the screen.

22. An apparatus comprising:
    a processor;
    an image pickup unit coupled to the processor that is configured to capture a plurality of photographed images of a person;
    a face detection unit coupled to the processor that is configured to detect a face region of the person in each of the plurality of captured photographed images and a selection of a face image from among two or more face images of the person, the two or more face images being taken from the plurality of captured photographed images of the person and corresponding to the face region detected in the plurality of photographed images;
    a display unit coupled to the processor that is configured to display the two or more face images of the person in a region of a screen; and
    an image synthesizing unit coupled to the processor that is configured to create a synthesized image by replacing portions of the face image on a base image with portions of the selected face image and display the synthesized image using the selected face image as a face of the person, wherein the base image is selected from a first group of candidate base images and the face image selected from a second group of candidate face images, wherein the first group and the second group are different groups.

23. The apparatus according to claim 22, wherein the synthesized image comprises a combination of the selected face image and the base image.

24. The apparatus according to claim 22, wherein the display unit further displays an indicator with the selected face image at the region of the screen.

25. The apparatus according to claim 22, wherein the display unit displays the detected face image for the person at a second region of the screen.

26. The apparatus according to claim 25, wherein the display unit provides a shape around the detected face image for the person displayed at the second region of the screen.

27. The apparatus according to claim 25, wherein the face detection unit detects a face region of the person and a second person in the photographed images and
    the display unit displays face images of the person and the second person at the second region of the screen.

* * * * *

UNITED STATES PATENT AND TRADEMARK OFFICE
CERTIFICATE OF CORRECTION

PATENT NO. : 10,291,841 B2
APPLICATION NO. : 14/799738
DATED : May 14, 2019
INVENTOR(S) : Kim et al.

It is certified that error appears in the above-identified patent and that said Letters Patent is hereby corrected as shown below:

In the Claims

Column 11, Line 54, Claim 1, please replace "creating" with --create--
Column 12, Line 19, Claim 7, please remove the extra "," before "to"
Column 12, Line 50, Claim 11, please replace "thee" with --face--
Column 12, Line 59, Claim 11, please replace "creating" with --create--
Column 13, Lines 4 and 5, Claim 13, please replace "wherein the processor further to" with --wherein the processor is further configured to--
Column 13, Lines 11 and 12, Claim 15, please replace "wherein the processor further to" with --wherein the processor is further configured to--
Column 13, Lines 16 and 17, Claim 16, please replace "wherein the processor further to" with --wherein the processor is further configured to--
Column 13, Line 39, Claim 17, please replace "tint" with --first--
Column 13, Line 43, Claim 18, please replace "farther" with --further--

Signed and Sealed this
Nineteenth Day of September, 2023

*Katherine Kelly Vidal*
Katherine Kelly Vidal
*Director of the United States Patent and Trademark Office*